(No Model.)
T. BARRETT & E. A. COPP.
COMBINED FISH PLATE AND NUT.
No. 449,659. Patented Apr. 7, 1891.
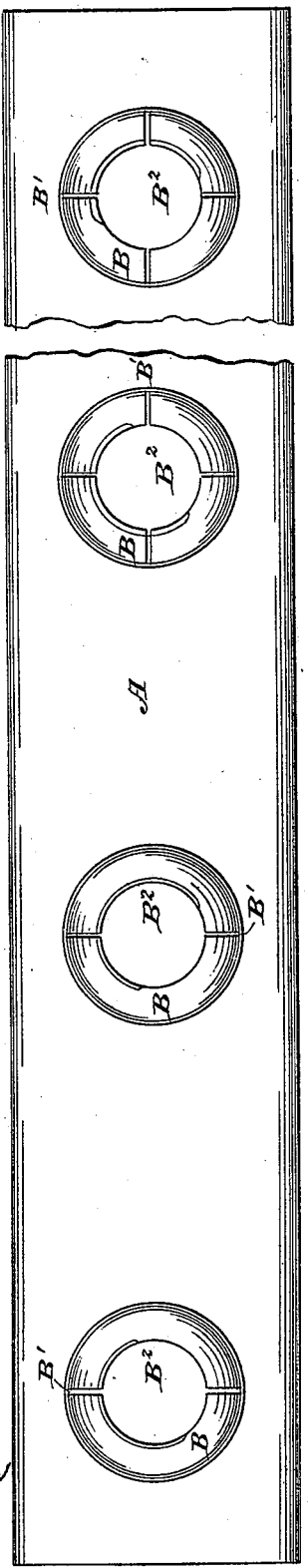
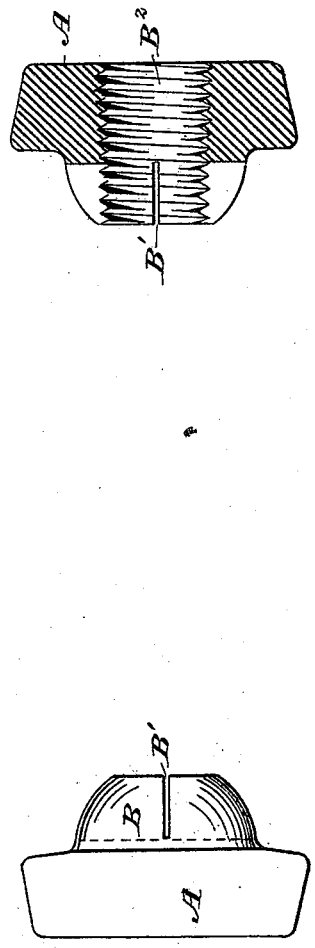
WITNESSES:
INVENTORS:
Thomas Barrett
Edmond Alfred Copp
BY Richards
ATTORNEYS

UNITED STATES PATENT OFFICE.

THOMAS BARRETT AND EDMUND ALFRED COPP, OF ADELAIDE, SOUTH AUSTRALIA.

COMBINED FISH-PLATE AND NUT.

SPECIFICATION forming part of Letters Patent No. 449,659, dated April 7, 1891.

Application filed December 13, 1890. Serial No. 374,579. (No model.)

*To all whom it may concern:*

Be it known that we, THOMAS BARRETT, bolt and nut maker, and EDMUND ALFRED COPP, agent, subjects of the Queen of Great Britain, residing at Adelaide, in the Province of South Australia, have invented an Improved Combined Plate and Nut for Railway and other Purposes, of which the following is a full, clear, and exact description.

Our invention relates more particularly to the fish-plates or joints used for connecting the ends of rails in the permanent way of railways or tramways, but is applicable, also, to other similar purposes where a screw-threaded bolt and loose nut are used in conjunction with a plate, and especially where it is of importance that the said bolts should be prevented from becoming loose or unscrewed by vibration or other cause.

In carrying out our invention we make the screw-threaded hole through the plate and projecting piece or boss with tapering sides, and provide the projecting piece or boss with one or two transverse slots or saw-gates, cut almost to the face of the plate, so as to allow its radial expansion.

The special construction of our invention permits of the cheeks or divided parts of the projecting piece or boss having a much firmer grip of the bolt than is obtained by any loose nut at present in use and renders it practically impossible for the bolt to work loose.

In order that our invention may be the better understood, we will now proceed to describe the same by reference to the accompanying drawings, in which—

Figure 1 is a side elevation of a shallow fish-plate to which our invention is applied; Fig. 2, an end elevation of the same; Fig. 3, an end sectional elevation of the same.

Similar letters refer to similar parts in all figures.

A is a fish-plate or other plate; B, projecting piece or boss, preferably circular; B', transverse cut or saw-gate; B², taper hole having an internal screw-thread. The boss B may be provided with one or two transverse cuts or saw-gates B', and these should preferably be cut as deep as possible without entering the face of the plate A.

Having now particularly described and ascertained the nature of our said invention and in what manner the same is to be performed, we declare that what we claim is—

An improved combined plate and nut consisting of a plate provided with a projecting piece or boss having transverse cuts or saw-gates and provided throughout with a screw-threaded tapering hole, substantially as and for the purpose specified.

In witness whereof we have hereunto set our hands in presence of two witnesses.

THOMAS BARRETT.
EDMUND ALFRED COPP.

Witnesses:
  FRANCIS H. CROW,
  CHARLES S. BURGESS.